United States Patent [19]

Wilson et al.

[11] Patent Number: 4,621,694
[45] Date of Patent: Nov. 11, 1986

[54] USE OF A LIQUID MEMBRANE FOR SCALE REMOVAL

[75] Inventors: Peggy M. Wilson, Dallas; Ernest L. Muegge, Grand Prairie, both of Tex.

[73] Assignee: Mobil Oil Corporation, New York, N.Y.

[21] Appl. No.: 770,928

[22] Filed: Aug. 30, 1985

[51] Int. Cl.$^4$ .................. E21B 37/00; E21B 37/08
[52] U.S. Cl. .................. 166/312; 252/8.552
[58] Field of Search ............ 166/279, 304, 310, 311, 166/312; 252/8.55 B; 134/22.1, 22.11, 22.14, 22.19

[56] References Cited

U.S. PATENT DOCUMENTS 3,951,827  4/1976  Burroughs et al. ............ 166/312 X
4,030,548  6/1977  Richardson et al. ........... 166/312 X

*Primary Examiner*—Stephen J. Novosad
*Assistant Examiner*—Thomas J. Odar
*Attorney, Agent, or Firm*—Alexander J. McKillop; Michael G. Gilman; Charles A. Malone

[57] ABSTRACT

A method for removing scale-forming ions from oil and gas production equipment. An external aqueous phase of a liquid membrane system contacts said scale and solubilizes said scale-forming compounds. Scale forming ionic compounds are then transferred into an immiscible liquid hydrocarbonaceous membrane phase having a complexing agent for scale forming ions. Said hydrocarbonaceous membrane phase envelops droplets of an internal aqueous phase which has a stronger complexing agent for scale forming ions than is contained in said hydrocarbonaceous membrane phase. Scale forming ions are transferred from said hydrocarbonaceous membrane phase and are accumulated and concentrated in said internal aqueous phase. Films of scale are thus progressively removed from surfaces where they have deposited.

23 Claims, 1 Drawing Figure

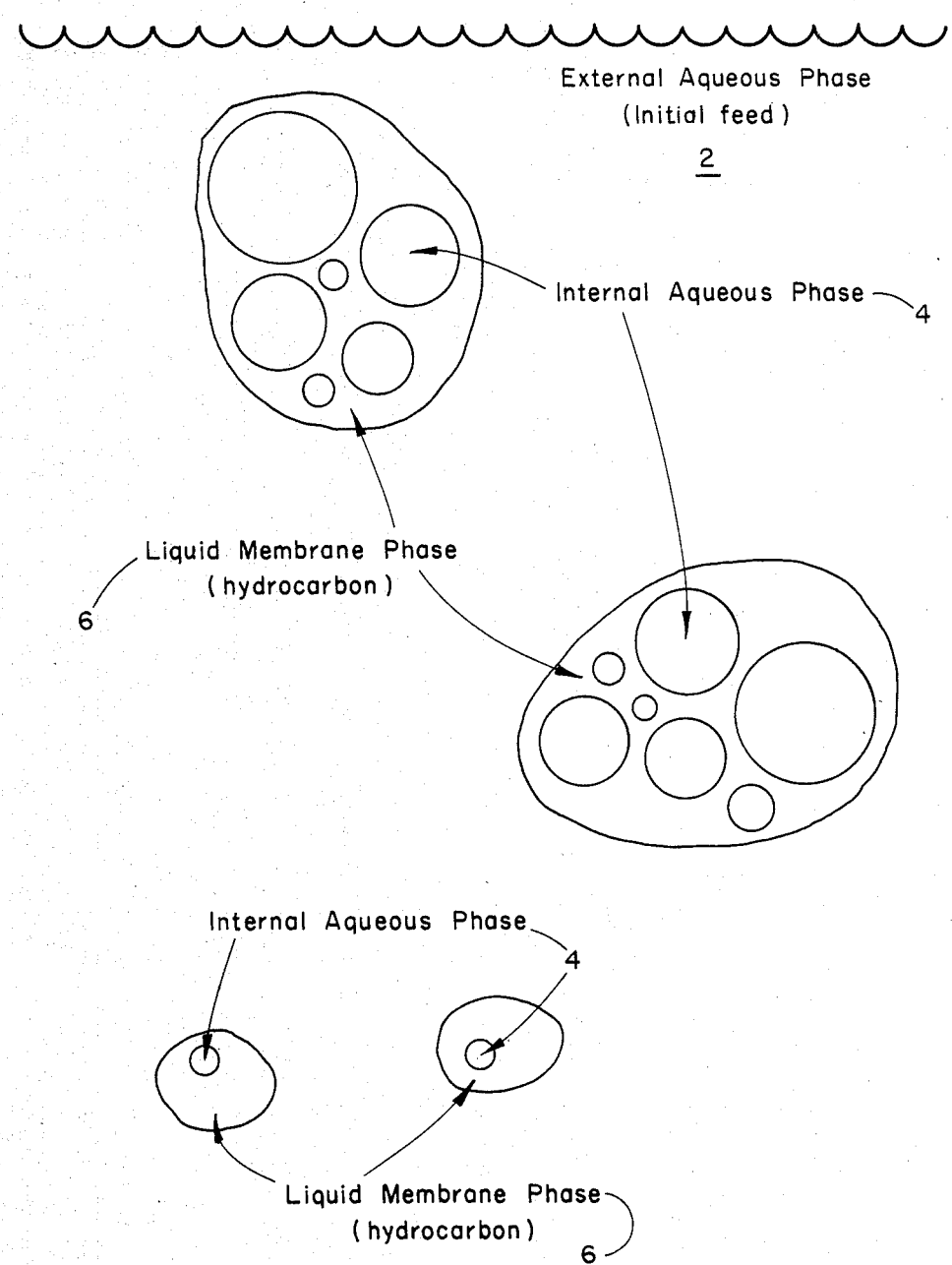

USE OF A LIQUID MEMBRANE FOR SCALE REMOVAL

FIELD OF THE INVENTION

This invention is directed to a method for the removal of scale found in oil and gas production equipment which method utilizes liquid membrane systems.

BACKGROUND OF THE INVENTION

Inorganic chemical scales often form in oil and gas production equipment and cause limitations on the oil and gas handling capacity of that equipment. Prevention or removal of the scale is expensive and sometimes difficult. Calcium carbonate and calcium sulfate scales can usually be removed by conventional methods. Barium and strontium sulfate scale, on the other hand, cause severe problems. They are a major factor in the loss of production from oil wells in many fields.

Present efforts are directed toward washing the equipment with aqueous solvents such as acids or toward physically removing the scale by mechanical means. These methods are expensive, often difficult to conduct and rarely effective on barium or strontium sulfate. In a few cases, aqueous solutions of complexing agents are used to dissolve the barium or strontium sulfate scale. However, these solvents are also expensive and are not fully effective. Therefore, a novel, inexpensive method of removing scale from oil and gas production equipment is needed. Liquid membrane systems provide a novel way of removing scale from oil and gas production equipment. Although others have used liquid membrane systems for pollution control in the removal of heavy metals from waste water streams, liquid membrane systems proposed for use to remove scale is a novel concept. Use of liquid membrane systems for selective ion transfer has been proposed. Indeed, a patent was issued for the use of the selective membrane system to remove pollutants from water. It issued Sept. 29, 1981 to Li as U.S. Pat. No. 4,292,181. Li in U.S. Pat. No. 4,259,189 issued Mar. 31, 1981, disclosed novel liquid membrane formulations for use in high temperature applications. In U.S. Pat. No. 4,014,785 issued to Li et al. on Mar. 29, 1977, novel liquid membrane formulations were proposed for use in the treatment of sourwater feed streams. Singhal et al. disclosed novel liquid membrane formulations in U.S. Pat. No. 3,969,265 issued July 13, 1976. Via this patent, novel liquid membrane formulations were developed to provide stable emulsions; these compositions were proposed for use in a liquid membrane sour water treating process wherein a waste water stream contained ammonium sulfide.

Until now, no one has used liquid membrane systems to remove scale from oil and gas production equipment.

SUMMARY OF THE INVENTION

This invention is directed to a liquid membrane process or technique for removing scale-forming ions from boreholes and other oil and gas production equipment. This method includes contacting said scale with a three-phase emulsion. The emulsion includes an aqueous external phase and an aqueous internal phase, separated by a liquid hydrocarbon phase. The hydrocarbon phase is immiscible with the two said aqueous phases and it contains a first complexing agent. This complexing agent is capable of forming a complex with one or more of the ions in said scale-forming compound. Complexes of ions with said first complexing agent are soluble in said hydrocarbon phase. An internal aqueous phase is contained in and is immiscible with the hydrocarbon phase. The internal aqueous phase contains a second complexing agent capable of forming a second complex with said scale-forming ions. The strength of the complex of the scale-forming ions and said second complexing agent is much greater than the strength of the complex of the scale-forming ions and the first complexing agent. Scale-forming ions form scale which dissolve feebly into the aqueous external phase. These ions are complexed in the hydrocarbon membrane phase and are then drawn into the aqueous internal phase because of the stronger complexing strength of the second complexing agent. The weakly and difficulty soluble scales of barium and/or strontium sulfate are hereby removed from borehole perforations and metal surfaces and are prevented from redeposition.

It is therefore an object of this invention to provide an efficient and novel way to remove scale from oil and gas production equipment.

It is a further object of this invention to remove intractable barium or strontium sulfate scale, or other similar scale generally found downhole in hydrocarbonaceous fluid producing equipment.

BRIEF DESCRIPTION OF THE DRAWING

The drawing is a schematic representation of a liquid membrane system.

DESCRIPTION OF THE PREFERRED EMBODIMENTS

In the practice of this invention, fluid within a wellbore containing scale is removed. These fluids can be removed by an inert buffer phase. After removal of the wellbore fluids, an emulsion containing a liquid membrane phase which encases droplets of an internal aqueous phase is mixed with an external aqueous phase and is injected into the wellbore. The internal aqueous phase is thus repeated from the external aqueous phase by the hydrocarbon containing liquid membrane phase. Upon injection into the wellbore, the external aqueous phase bathes and contacts scales deposited in bore-hole perforations and other areas within the wellbore.

$BaSO_4$, $SrSO_4$, $CaSO_4$, and $CaCO_3$ are dissolved in the external aqueous phase at low concentrations. $Ba^{++}$, $Sr^{++}$ and $Ca^{++}$ ions are collected in the liquid membrane phase by a chelating agent. Afterwards, said ions diffuse through said liquid membrane into the encased droplets in the internal aqueous phase. These ions continually accumulate in droplets of the internal aqueous phase which contains a second chelating agent. The composition of said second chelating agents is such that the accumulation of said ions is markedly greater than the concentration in said external aqueous phase. Continuous migration of said ions into the external aqueous phase into the liquid membrane phase and into droplets of said internal aqueous phase causes films of scale to be progressively removed from surfaces where they have been deposited.

In another embodiment, pump, pipes, valves and other production equipment can be removed and placed within a vessel suitable therefor. These parts can then be immersed in an emulsion as discussed above for the removal of scale. A method for removal of inorganic species by a liquid membrane process is disclosed by Li et al. in U.S. Pat. No. 3,637,488 which is hereby incorporated by reference.

Once the liquid membrane system has become saturated or has reached its capacity to retain scale-forming ions, the emulsion is subjected to a deemulsification process to remove the scale-forming ions from the liquid internal aqueous phase and the hydrocarbonaceous liquid membrane phase. Methods for deemulsification of the liquid membrane can be found in U.S. Pat. No. 4,292,181 issued to Li et al. which is hereby incorporated by reference herein.

A wide range of temperatures may be utilized in the process of the instant invention since temperature is not critical. There would, however, be a lower and an upper limit which would be satisfactory for separation with a liquid phase surfactant membrane. The lowest temperature should be higher than the freezing temperature of any of the liquids contacted, such as the well water. It will also have to be higher than the freezing temperature of the emulsified aqueous mixture so that mass transfer will be facilitated. Since liquid membrane permeation rates increase with increasing temperature, as high a temperature as possible should be employed. Typical temperatures would vary from above about 0° to about 60° C., preferably about 25° to about 40° C. and would most preferably be ambient. These ambient temperatures will generally be encountered when mixing the emulsified aqueous mixture above ground.

Upon placement of the emulsified aqueous mixture downhole into a well, temperatures may be encountered substantially above 60° C. Downhole temperatures in a hydrocarbonaceous well can vary from about 15° C. to about 200° C. depending upon the well depth. Temperatures up to about 200° C. will not affect the emulsified aqueous mixture, providing appropriate emulsifying agents are used, as is known to those skilled in the art.

This process provides a novel process for the dissolution of scales, particularly intractable $BaSO_4$ and $SrSO_4$. Referring to the drawing, a liquid membrane solvent medium for scales encountered in production equipment and wellbores typically consists of an external aqueous phase 2, which bathes said scale. Said external aqueous phase may contain concentrations of dissolved electrolytes, e.g. NaCl, $Na_2SO_4$, and KCl, in an amount normally found in seawater except that sulfates should not be used. However, the concentration of electrolyte can be greater or less than the electrolyte concentration found in seawater. The external aqueous phase 2 may be obtained from other natural sources. These sources may comprise well water, lake water, water produced in an oil field, and other fresh water sources. When using fresh water sources, electrolyte may be added to obtain an increased dissolution of said scale. To obtain a higher concentration of the scale forming ions in external aqueous phase 2, a third chelating compound having a lower chelating strength than the chelating or complexing agent used in either internal aqueous phase 4 or liquid membrane phase 6 may be used in external aqueous phase 2. A sodium salt of ethylenediaminetetraacetic can be used as the chelating or complexing agent in the external aqueous phase. Blount et al., in U.S. Pat. No. 3,913,678 disclosed a method for removing scale from an underground hydrocarbon fluid producing formation by the use of ethylenediaminatetraacetic acid ("EDTA"). This patent is hereby incorporated by reference herein.

Internal aqueous phase 4 in the form of droplets contains one or more very strong chelating agents for $Ba^{++}$ and $Sr^{++}$ ions. Aqueous phase 4 can also contain electrolytes. A preferred chelating agent for utilization in internal aqueous phase 4 is a pentasodium salt of diethylenetriaminepentaacetic acid. Said agent is sold under the trade name Versenex 80 by Dow Chemical Company located in Midland, Mich. Versenex 80 ("Versenex") is a chelating or complexing agent for barium and is 40 percent active in water. This water soluble complexing agent complexes the barium ion more strongly than does the oil soluble complex used in liquid membrane phase 6. It also draws the barium ions out of their complex in liquid membrane phase 6 and binds them into internal aqueous phase 4.

Liquid membrane phase 6 is a non-aqueous phase, comprised preferably of liquid hydrocarbons which separate the external aqueous phase 2 from internal aqueous phase 4. Separation occurs because said non-aqueous phase forms an envelope around the internal aqueous phase 4. Said envelope contains one or more chelating or complexing agents for $Ba^{++}$ and $Sr^{++}$ which are stronger chelants than in external aqueous phase 2 and weaker than those contained in internal aqueous phase 4. Generally, said liquid hydrocarbon comprises a water-immiscible solvent which may be chosen from the class consisting of hydrocarbons, halogenated hydrocarbons, and ethers. The oil component, of course, must be liquid at the conditions at which the instant compositions are used, must be capable of dissolving the particular additives chosen, and also must be capable, in conjunction with the particular additive, of forming a stable water in oil emulsion with the internal aqueous phase 4.

A method which is suitable for preparing a hydrocarbonaceous liquid membrane is described in U.S. Pat. No. 4,259,189 issued to Li on Mar. 31, 1981, which is hereby incorporated by reference. This patent also describes the strengthening agents, additives, surfactants which can be used in the practice of this invention for making liquid membranes. The liquid membrane phase surrounding said internal aqueous phase 4 is composed of a hydrocarbonaceous material. This hydrocarbonaceous material has combined therein a first complexing agent known as dinonylnaphthalene sulfonic acid, which is sold under the trade name Synex DN-052, which is sold by King Industries, Inc. This product is 50% active in Norpar 12 which is a trademark for a $C_{10}$–$C_{13}$ normal paraffin product of Exxon Corporation. Synex DN-052 is combined with the hydrocarbonaceous liquid which liquid is in an amount sufficient for use in removing scale from oil and gas production. Synex DN-052 will hereinafter be referred to as "Synex." Other hydrocarbons which can be used in the liquid membrane phase 6 include didecylnaphthalene sulfonic acid and didodecylnaphthalene sulfonic acid.

In order to show the effectiveness of this method, the following tests were conducted:

Test 1

This test is an extraction test in which removal of barium ions from an external aqueous phase 2 into liquid membrane phase 6 is demonstrated. Solutions of barium chloride were extracted with Synex, used as received at 50 percent active concentration. Equal volumes, 50 ml each, of $BaCl_2$ and Synex solutions were placed in 4 oz. wide mouth jars, the jars were capped, and the contents were mixed for 7.5 hours with magnetic stirrers at room temperature, about 25° C. Variations in solution viscosity prohibited operation of all of the stirrers at the same speed. The layers then were allowed to gravity separate overnight. Samples were withdrawn by syringe from each of the aqueous and oil layers and were analyzed for barium. Care was tken to avoid inclusion of emulsified interfacial material in the samples. The aqueous layers from the 0.001, 0.01, and 0.02M barium chloride solutions retained undetermined amounts of hydrocarbon emulsified through them, which was ignored.

Four solutions of barium chloride were treated similarly at approximately 35° C.

The results obtained are shown in Table 1.

Test 2

This test is an extraction test which demonstrates that internal aqueous phase 4 containing Versenex 80 was capable of removing barium ions from liquid membrane phase 6 which contained said Synex complexing agent. Duplicates of some of the first extractions were conducted simultaneously with the above extractions but were not used for analysis. The resulting Synex layers were then withdrawn and were separately extracted with the aqueous solutions of Versenex, used as received at 40 percent active. This was done separately from the initial feed solutions to avoid risk of contamination of the Versenex layers by feed solution and confusion in the results. Interfacial emulsions restricted the smallest Synex sample to 19 ml; so 19 ml of each Synex layer and 19 ml of Versenex solution were paired in 2 oz. wide mouth jars. They were magnetically stirred, settled, and sampled at room temperature, then analyzed for barium. The analytical data are on Table 1.

Barium concentrations were determined with the inductively coupled argon plasma emission spectrograph ("ICP"). Approximate values of the barium concentrations were obtained rather than accurate values.

Analysis of the Synex phase showed that dissolved barium had entered it in notable quantities. The Synex liquid membrane took up barium to the extent of 130 times the solubility of barium sulfate in water. The net result was that the liquid membrane took up its full capacity of barium and transferred some of it to the second aqueous phase. Barium was transported effectively against the direction of the concentration gradient.

In the table, the partition coefficient is the ratio of the barium concentrations in the Synex phase divided by the barium in the first aqueous phase after the first extraction and the ratio of that in the Versenex phase divided by that remaining in the Synex phase after the second extraction. The extraction ratios are the fraction of barium transferred from the external aqueous phase 2 to the Synex phase 6 and to the Versenex phase 4. Although these ratios are burdened with the errors in column (c) of Table 1, they indicate the trend of effective transfer of barium from the initial aqueous solution toward the inner, second phase.

Further proof of the functioning of the liquid membrane process is gained from the reduction in the extent of transfer of barium from feed to Synex as the Synex capacity is reached. The close match between expected and theoretical values, at both temperatures, suggests that the high values in the middle of column (c) may have been caused by other reasons than the error with the ICP plasma tube.

The overall Versenex extraction ratio exceeded 80 percent, presuming the Synex solutions used in these extractions were of the same concentrations. Just as Synex was able to draw down the barium concentration from the initial feed, Versenex was nearly as effective in extracting barium from the Synex phase. Versenex clearly complexes barium more strongly than Synex does.

TABLE 1

| TRANSFER OF BARIUM IONS FROM FIRST TO SECOND AQUEOUS PHASE | | | | | | | | |
|---|---|---|---|---|---|---|---|---|
| After First Extraction | | | | | After Second Extraction | | | |
| Barium Conc. mm/l | | | | | Barium Conc., mm/l | | | |
| | | | | | | Internal | | |
| External Aqueous Phase (a) | Internal Aqueous Phase (b) | Hydrocarbon Synex Phase (c) | Partition Coefficient (d) | Extraction Ratio (e) | Hydrocarbon Synex Phase (f) | Aqueous Versenex Phase (g) | Partition Coefficient (h) | Overall Extraction Ratio (i) |
| 25° C.: | | | | | | | | |
| 1 | 0.028 | 0.95 | 34 | 0.95 | | | | |
| 10 | .027 | 12.2 | 453 | 1.2 | | | | |
| 20 | .050 | 39 | 780 | 1.9 | 0.36 | 17 | 48 | 0.85 |
| 50 | .019 | 89 | 4680 | 1.8 | .50 | 45 | 90 | .90 |
| 80 | .055 | 150 | 2720 | 1.8 | 1.32 | 66 | 50 | .82 |
| 100 | .71 | 146 | 205 | 1.5 | | | | |
| 150 | 3.82 | 237 | 62 | 1.6 | .93 | 119 | 129 | .79 |
| 200 | 12.6 | 285 | 23 | 1.4 | 1.15 | 116 | 101 | .83 |
| 500 | 211 | 424 | 2 | .85 | 2.26 | 270** | 119 | .54 |
| 1000 | 810 | 488* | .6 | .49 | | | | |
| 35° C.: | | | | | | | | |
| 1 | .026 | .99 | 39 | .99 | | | | |
| 10 | .019 | 12.3 | 649 | 1.2 | | | | |
| 100 | .38 | 126 | 334 | 1.3 | | | | |
| 1000 | 756 | 463 | .61 | .46 | | | | |

*Synex capacity is approximately 482 millimoles (mm) per liter (l).
**Versenex capacity is approximately 2225 millimoles (mm) per liter (l).

The ICP was operated under less than favorable conditions, i.e., questionable stability of the plasma. An error of 10-20 percent can be expected. Consequently, the barium concentrations in Table 1 are only approximate but are sufficiently good enough to indicate trends.

Although the present invention has been described with preferred embodiments, it is to be understood that modifications and variations may be resorted to without departing from the spirit and scope of this invention, as those skilled in the art will readily understand. Such modifications and variations are considered to be within the purview and scope of the appended claims.

What is claimed is:

1. A liquid membrane method for removing scale from equipment containing same via an emulsion which comprises:
   (a) contacting said scale containing equipment with an external aqueous phase which causes said scale to solubilize into scale-forming ions in said external aqueous phase;
   (b) mixing an emulsion into said external aqueous phase which emulsion contains an immiscible liquid hydrocarbonaceous membrane phase having a first complexing agent for said scale forming ions therein enveloped around droplets of an internal aqueous phase having a stronger second complexing agent for said scale-forming ions than the first complexing agent in said hydrocarbonaceous membrane phase; and
   (c) transferring said scale forming ions from said external aqueous phase into said hydrocarbonaceous membrane phase which ions are then transferred from said hydrocarbonaceous membrane phase into said internal aqueous phase where said ions are accumulated and concentrated which causes scale to be removed from said equipment.

2. The method as recited in claim 1 where in step (a) said scale-forming ions comprise calcium, barium, and strontium ions.

3. The method as recited in claim 1 where in step (b) said hydrocarbonaceous membrane phase has as a first complexing agent a member selected from the group consisting of dinonylnaphthalene sulfonic acid, didecylnaphthalene sulfonic acid, and didodecylnaphthalene sulfonic acid.

4. The method as recited in claim 1 where in step (c) said hydrocarbonaceous membrane phase has as a first complexing agent dinonylnaphthalene sulfonic acid which removes barium and strontium ions from said scale-forming external aqueous phase in an amount from about 50 to about 130 times the solubility of barium sulfate and strontium sulfate in water.

5. The method as recited in claim 1 where in step (b) said first complexing agent is dinonylnaphthalene sulfonic acid which is mixed with said hydrocarbonaceous membrane phase in about 5.0 volume percent to about 25.0 volume percent, preferably about 20.0 volume percent.

6. The method as recited in claim 1 where said liquid membrane method is utilized at a temperature from above about 0° C. to about 200° C.

7. The method as recited in claim 1 where in step (b) a pentasodium salt of diethylenetriaminepentaacetic acid comprises the second complexing agent.

8. The method as recited in claim 1 where in step (b) said second complexing agent is a pentasodium salt of diethylenetriaminepentaacetic acid and is of a strength sufficient to remove barium and strontium ions from said liquid hydrocarbonaceous membrane phase in an amount from about 250 to about 650 times the solubility of barium sulfate in water.

9. The method as recited in claim 1 where in step (b) said second complexing agent is pentasodium salt of diethylenetriaminepentaacetic acid and is mixed with said internal aqueous phase in an amount of about 5.0 volume percent to about 25.0 volume percent, preferably about 20.0 volume percent.

10. The method as recited in claim 1 where in step (a) said external aqueous phase contains at least one complexing agent.

11. The method as recited in claim 1 where in step (a) said external aqueous phase contains the sodium salt of ethylenediaminetetraacetic acid as a complexing agent.

12. A liquid membrane method for removing scale contained within wellbores and equipment affixed thereto used in the production of hydrocarbonaceous fluids comprising:
   (a) removing hydrocarbonaceous fluids from said wellbore and equipment;
   (b) preventing the intrusion of additional hydrocarbonaceous fluids within said wellbore;
   (c) placing within said wellbore and equipment an emulsion containing an external aqueous phase and an immiscible liquid hydrocarbonaceous membrane phase enveloped around droplets of an internal aqueous phase;
   (d) contacting said scale contained within said wellbore and equipment with said external aqueous phase which causes said scale to solubilize into scale-forming ions in said external aqueous phase;
   (e) transferring said ions from said external aqueous phase into said hydrocarbonaceous membrane phase which contains a first complexing agent for reacting with said scale forming ions;
   (f) transferring and concentrating said scale forming ions from said hydrocarbonaceous membrane phase into said internal aqueous phase which has a stronger second complexing agent than said first complexing agent;
   (g) continuing the transfer of said ions from said scale into said external aqueous phase into said hydrocarbonaceous membrane phase and then into said internal aqueous phase where said ions are concentrated for a time sufficient to remove substantially all scale from said wellbore and equipment.

13. The method as recited in claim 12 where in step (d) said scale-forming ions comprise calcium, barium, and strontium ions.

14. The method as recited in claim 12 where in step (e) said hydrocarbonaceous membrane phase has as a first complexing agent a member selected from the group consisting of dinonylnaphthalene sulfonic acid, didecylnaphthalene sulfonic acid, and didodecylnaphthalene sulfonic acid.

15. The method as recited in claim 12 where in step (e) said hydrocarbonaceous membrane phase has as a first complexing agent dinonylnaphthalene sulfonic acid which removes barium and strontium ions from said scale-forming external aqueous phase in an amount from about 50 to about 130 times the solubility of barium sulfate and strontium sulfate in water.

16. The method as recited in claim 12 where in step (e) said first complexing agent is dinonylnaphthalene sulfonic acid and is mixed with said external aqueous phase in about 5.0 volume percent to about 25.0 volume percent, preferably about 20.0 volume percent.

17. The method as recited in claim 12 where said liquid membrane method is utilized at a temperature from above about 0° C. to about 200° C.

18. The method as recited in claim 12 where in step (f) a pentasodium salt of diethylenetriaminepentaacetic acid comprises the second complexing agent.

19. The method as recited in claim 12 where in step (f) said second complexing agent is a pentasodium salt of diethylenetriaminepentaacetic acid and is of a strength sufficient to remove barium and strontium ions from said liquid hydrocarbonaceous membrane phase in an amount from about 250 to about 650 times the solubility of barium sulfate in water.

20. The method as recited in claim 12 where in step (f) said second complexing agent is a pentasodium salt of diethylenetriaminepentaacetic acid and is mixed with said internal aqueous phase in an amount of about 5.0 volume percent to about 25.0 volume percent, preferably about 20.0 volume percent.

21. The method as recited in claim 12 where in step (c) said external aqueous phase contains at least one complexing agent.

22. The method as recited in claim 12 where in step (c) said external aqueous phase contains the sodium salt of ethylenediaminetetraacetic acid as a complexing agent.

23. The method as recited in claim 12 where said emulsion is removed from said wellbore and equipment after step (g) and steps (c) through (g) are repeated.

* * * * *